(No Model.) 2 Sheets—Sheet 1.
L. E. SJELSTAD.
ANIMAL TRAP.
No. 558,317. Patented Apr. 14, 1896.
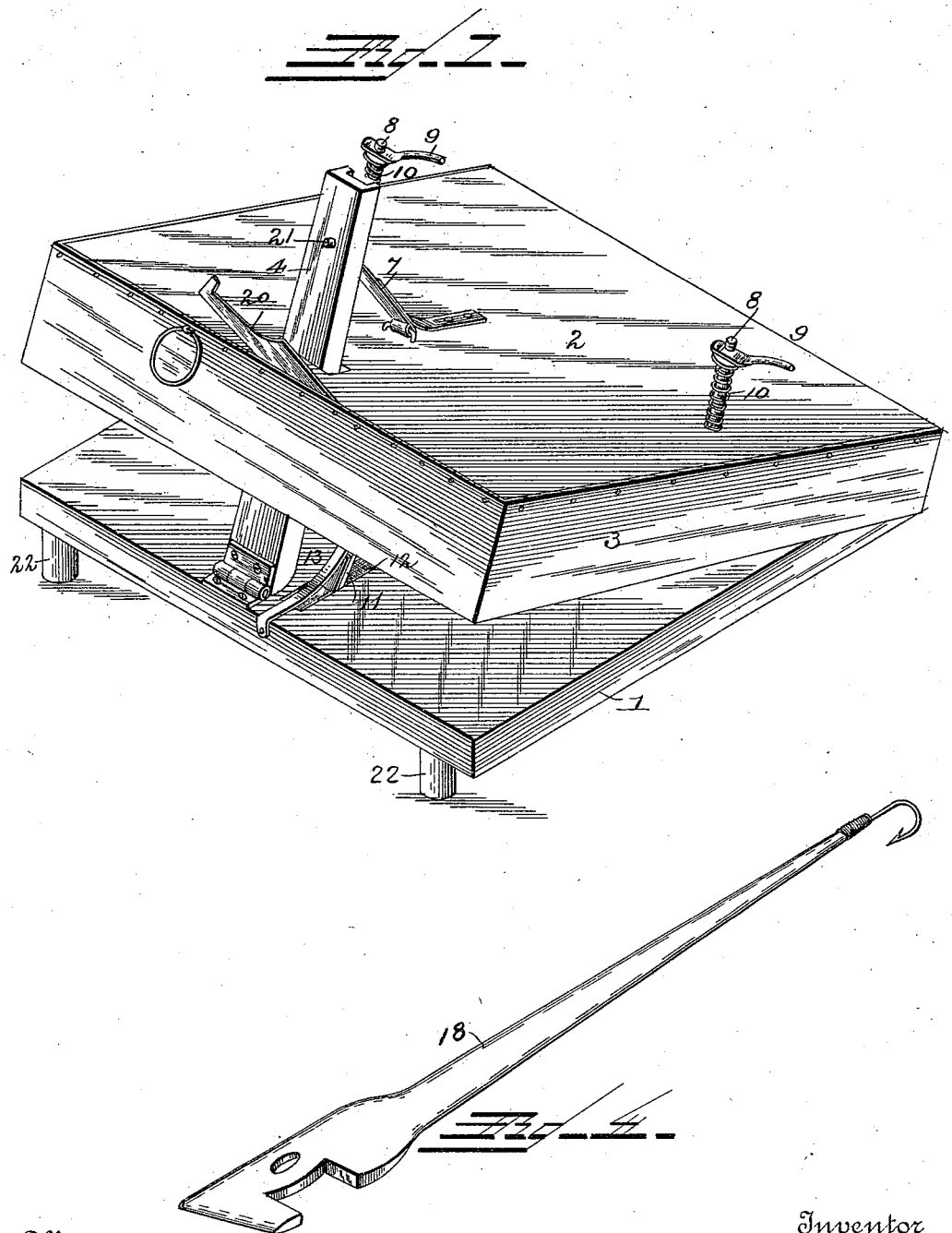
Witnesses
F. L. Ouraud
I. I. Suit
Inventor
Lornts E. Sjelstad
By J. H. Bewilson
Attorney (No Model.) 2 Sheets—Sheet 2.
L. E. SJELSTAD.
ANIMAL TRAP.
No. 558,317. Patented Apr. 14, 1896.
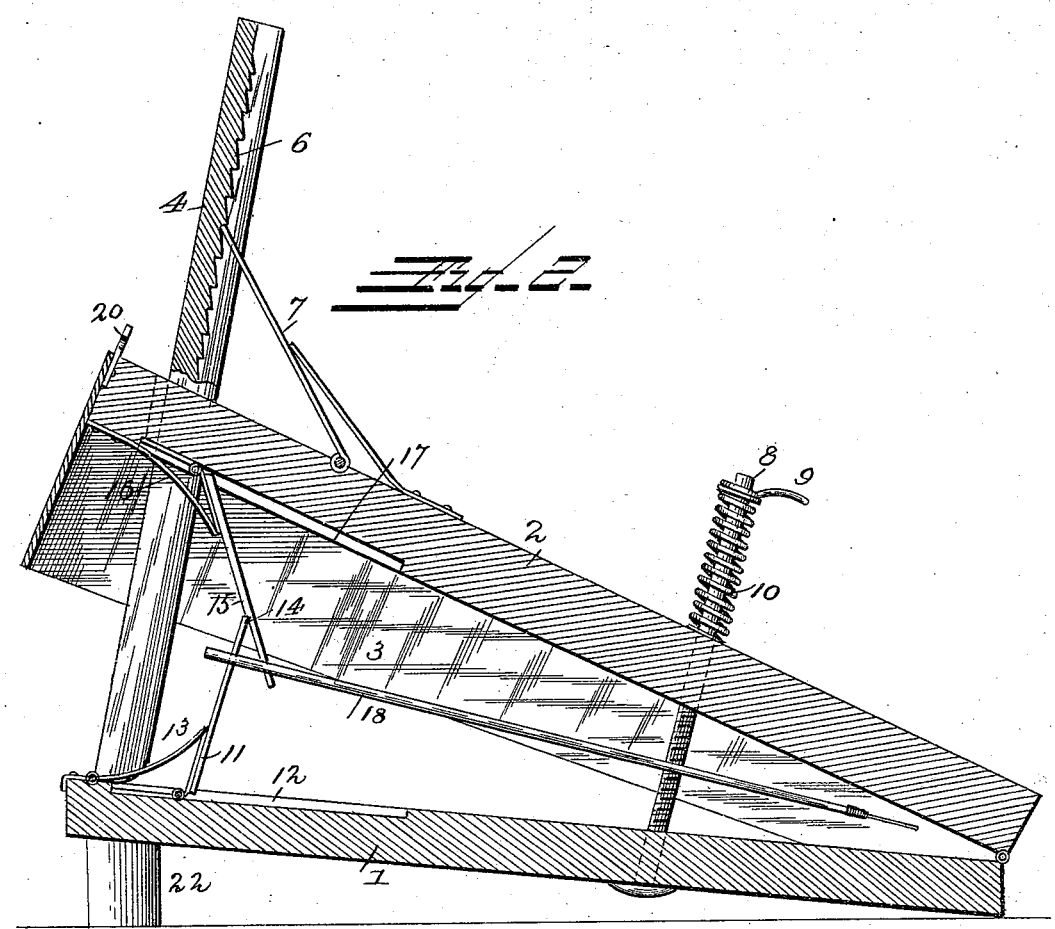
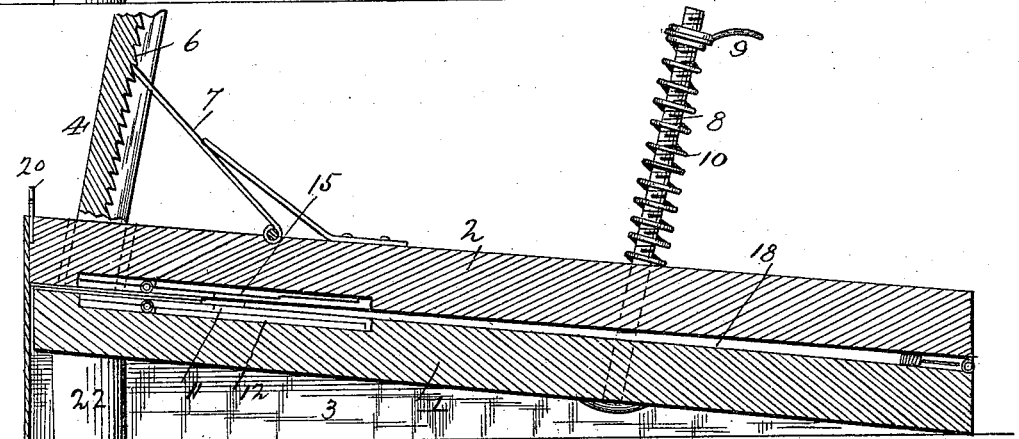
Witnesses
F. L. Ourand
A. P. Smith
Inventor
Lornts E. Sjelstad
By H. Bennison
Attorney

UNITED STATES PATENT OFFICE.

LORNTS E. SJELSTAD, OF SUNBURG, MINNESOTA.

ANIMAL-TRAP.

SPECIFICATION forming part of Letters Patent No. 558,317, dated April 14, 1896.

Application filed July 22, 1895. Serial No. 556,807. (No model.)

*To all whom it may concern:*

Be it known that I, LORNTS E. SJELSTAD, a citizen of the United States, residing at Sunburg, in the county of Kandiyohi and State of Minnesota, have invented certain new and useful Improvements in Animal-Traps; and I do declare the following to be a full, clear, and exact description of the invention, such as will enable others skilled in the art to which it appertains to make and use the same.

My invention relates to animal-traps.

The object of the invention is to provide a trap which shall be simple of construction, durable in use, and comparatively inexpensive of manufacture.

With these objects in view the invention consists of certain features of construction and combination of parts, which will be hereinafter fully described and claimed.

In the accompanying drawings, Figure 1 is a perspective view of the trap, showing it set. Fig. 2 is a longitudinal vertical sectional view showing the trap set. Fig. 3 is a similar view showing the trap sprung. Fig. 4 is a detail perspective view of the trigger.

1 denotes the bottom of the trap, and 2 the top, hinged to the rear edge of the bottom and provided with a marginal downward-extending flange 3.

4 denotes a post which is hinged to the bottom 1 and projects upward through an aperture 5 in the hinged top. The rear side of the post is provided with a series of teeth 6, which are engaged by a spring-actuated pawl 7, pivoted to the hinged top. When the trap has been sprung, this pawl will prevent the captured animal forcing the top up and escaping.

8 denotes bolts which extend through the bottom and hinged top and are provided at their upper end with hand-nuts 9, between which and the top are confined springs 10, the energy of which is exerted to force the cover down. By adjusting the nuts the tension of the springs may be varied.

The tripping mechanism comprises a strip 11, hinged to the bottom and pressed down in a groove 12 in the bottom by a spring 13, so as not to interfere with the closing of the top. The free end of this strip is adapted to engage a shoulder 14 on a strip 15, which is pivoted to the under side of the top and is actuated by a spring 16 to force it into a groove 17 in the top. A trigger 18 is pivoted to the strip 11 and has a notch 19 to receive the free end of the strip 15 to retain the trap in a set position. To the free end of the trigger, which may be in hook form, is adapted to be secured the bait.

20 denotes a hook pivoted to the front edge of the top and adapted to engage a stud 21, secured to the hinged post and holding the top open while the trigger is being baited and the tripping mechanism set.

22 denotes legs which are secured to the front corners of the bottom, so as to allow the marginal flange of the top to be forced below the bottom, and thereby preventing the captured animal working its way out between the edges of the bottom and the flange.

When the parts are arranged as shown in Figs. 1 and 2 and an animal enters the trap and takes the bait, the trigger will be depressed and will free itself from the lower end of the strip 15, which, in springing back to its seat, will release the strip 11, which will also be forced to its groove. As soon as the trigger is released the springs 10 will force the top suddenly downward and in a few seconds crush the life from the animal. When the top is forced downward, the pawl 7 will ride on the teeth 6 of the hinged post; but any effort on the part of the animal to raise the top will be checked by the pawl.

Having thus described my invention, what I claim, and desire to secure by Letters Patent, is—

1. A trap comprising a bottom, a spring-actuated top hinged to the bottom, a tripping mechanism, a post hinged to the bottom and projecting upward and provided with a series of teeth, and a spring-pressed pawl adapted to engage said teeth and prevent the raising of the top by the captured animal, substantially as set forth.

2. A trap comprising a bottom, a top hinged thereto, bolts passing through the bottom and top, band-nuts on the upper ends of said bolts, coil-springs located on said rods and confined between the top and band-nuts, tripping mechanism composed of a spring-actuated strip hinged to the top and provided with a shoulder, a second spring-actuated strip hinged to the bottom and adapted to engage the said shoulder, and a trigger pivoted to said second strip, and provided with a notch to receive the free end of the first-named strip, substantially as set forth.

In testimony whereof I affix my signature in presence of two witnesses.

LORNTS E. SJELSTAD.

Witnesses:
 PETER J. JOHNSON,
 T. THOMSON.